United States Patent [19] | [11] 4,420,783

Suezawa et al. | [45] Dec. 13, 1983

[54] MODE SELECTOR ASSEMBLY FOR USE IN TAPE RECORDERS

[75] Inventors: Takahiko Suezawa; Satoru Koizumi; Hiroaki Nakao; Takashi Tsuchitani, all of Higashihiroshima, Japan

[73] Assignee: Sharp Kabushiki Kaisha, Osaka, Japan

[21] Appl. No.: 281,129

[22] Filed: Jul. 7, 1981

[30] Foreign Application Priority Data

Jul. 7, 1980 [JP] Japan ............................ 55-96108[U]

[51] Int. Cl.³ ....................... G11B 15/18; G11B 19/02

[52] U.S. Cl. ...................................... 360/137; 360/69; 360/90

[58] Field of Search ............................ 360/137, 61–62, 360/69, 74.1, 90, 93, 96.1, 105

[56] References Cited

U.S. PATENT DOCUMENTS 4,167,764 9/1979 Hanajima et al. ..................... 360/90
4,253,123 2/1981 Hayashi et al. ....................... 360/69
4,272,792 6/1981 Nakamichi et al. ............ 360/137 X
4,336,560 6/1982 Matsumoto ........................ 360/137

*Primary Examiner*—John H. Wolff
*Attorney, Agent, or Firm*—Birch, Stewart, Kolasch and Birch

[57] ABSTRACT

A mode selector assembly for use in a tape recorder or the like is disclosed herein, for placing the tape recorder or the like into a selected operating mode by means of a rotating member upon the actuation of an actuator lever. The mode selector assembly includes a cam surface on the rotating member, interlocking device provided between the actuator lever and the rotating member for sliding movement with rotating movement of the cam surface, responsive to rotation of the rotating member and connecting means for connecting the actuator lever to the interlocking means. The actuator lever is shifted to its actuated position via the interlocking means in response to rotation of the cam surface immediately after the rotating member is rotated upon actuation of the actuator lever.

3 Claims, 3 Drawing Figures

F/G.2

MODE SELECTOR ASSEMBLY FOR USE IN TAPE RECORDERS

BACKGROUND OF THE INVENTION

The present invention relates to a mode selection assembly for use in tape recorders or the like and more particularly to an assembly for selecting one of the operating modes through the utilization of the rotating torque of a rotating member.

One example of tape recorders of the above mentioned kind has been proposed by the applicant of the present application, i.e., U.S. patent application Ser. No. 254,175 filed on Apr. 14, 1981. Upon depression of a play lever a trigger arm is disengaged from a cam gear before the lever is locked with a first lock plate. Therefore, even if the play lever is released from depression and returned to the non-actuated position without being locked with the first lock plate, the cam gear continues rotating to bring a subchassis, via a subchassis-actuating arm, into a second position where the magnetic head is in contact with the tape for the playback mode.

In other words, the tape recorder still stands in a play mode although the play lever has returned to its the home position, resulting in playing an undesired program and causing the operator some inconvenience.

It is therefore an object of the present invention to provide a mode selector assembly which overcomes the problems in the earlier filed assembly.

It is another object of the present invention to provide a mode selector assembly wherein an actuator lever is forcedly shifted to a locked position with a lock plate to set the tape recorder into a desired operating mode through the utilization of the rotation torque of a cam gear immediately after actuation of the actuator level which disengages a trigger arm from the cam gear and permits the cam gear to rotate.

In accordance with the present invention, there is provided a mode selector assembly for use in a tape recorder or the like for placing the tape recorder into a selected operating mode by means of a rotating member upon the actuation of an actuator lever, said mode selector assembly comprising a cam surface on the rotating member, interlocking means provided between the actuator lever and the rotating member for sliding movement with the rotating movement of the cam surface, responsive to rotation of the rotating member and connecting means for connecting the actuator lever to the interlocking means, wherein the actuator lever is shifted to the actuated position via the interlocking means in response to the rotation of the cam surface immediately after the rotating member is rotated upon actuation of the actuator lever.

BRIEF DESCRIPTION OF THE DRAWINGS

For a more complete understanding of the present invention and for further objects and advantages thereof, reference is now made to the following description taken in conjunction with the accompanying drawings, in which.

All of the drawings are plan views showing a mode selector assembly according to the present invention.

DETAILED DESCRIPTION OF THE INVENTION

Figure 1:
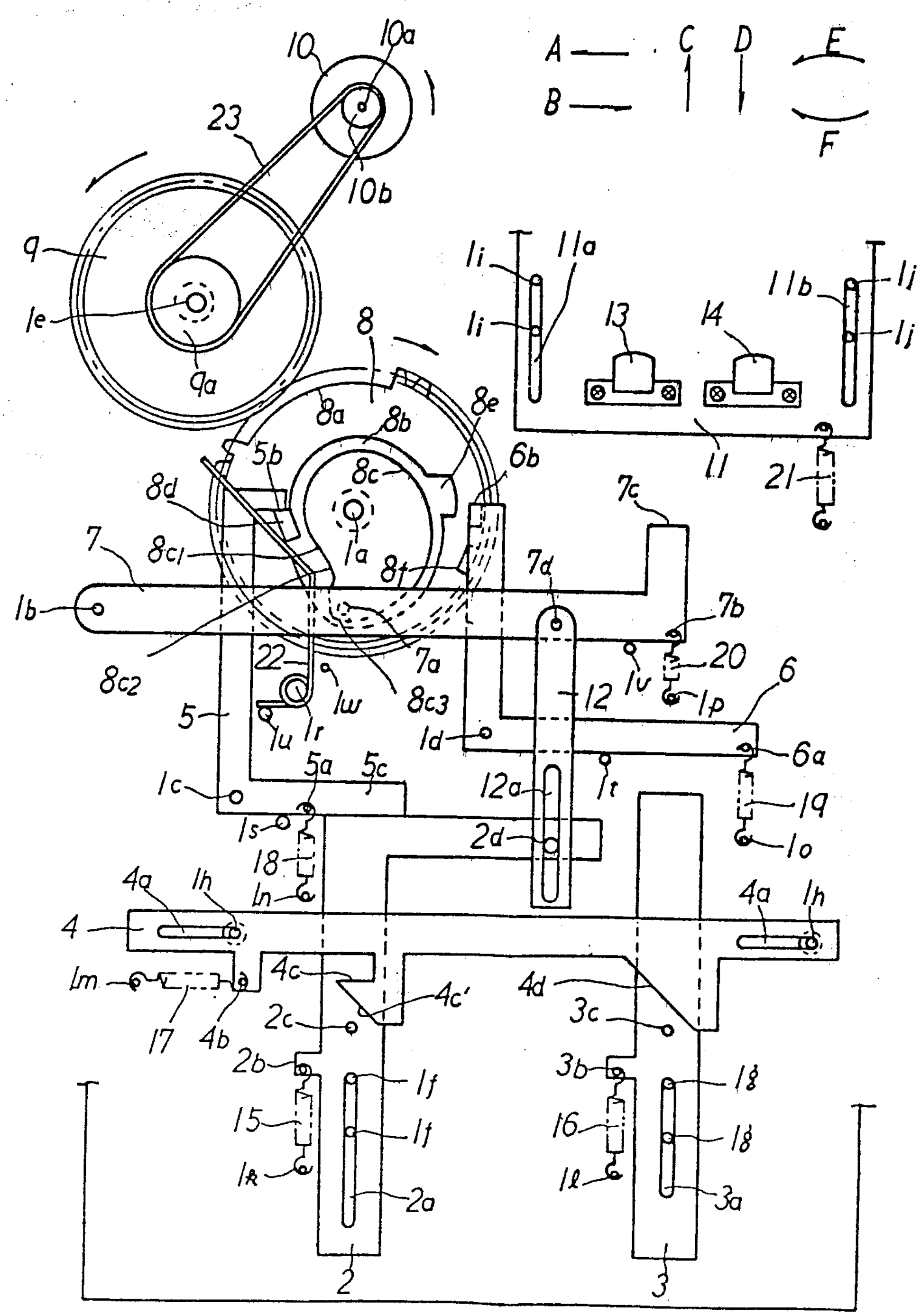
FIG. 1 shows the stop mode.

Referring now to FIG. 1, there is illustrated a principal portion of a tape recorder with a mode selector assembly according to the present invention, especially in the stop mode. On a main chassis 1 there is mounted an actuator lever 2 (since this lever is a play actuator lever in the illustrated embodiment, this lever is called a play actuator lever) and a stop lever 3. By inserting upstanding guide shafts *1f* and *1g* into guide holes *2a* and *3a* formed in the main chassis 1, both the lever 2 and 3 are made to be slidable between a non-actuated position (in stop mode) and an actuated position in the directions of the arrows C and D. Furthermore, both the levers are constantly urged into the non-actuated position in the direction of the arrow D by means of springs 15 and 16 extending between pins *1k* and *1l* standing on the main chassis 1 and pins *2b* and *3b*.

Of these levers, the play lever 2 has a lock pin *2c* and the stop lever 3 has an unlock pin *3c*. The play lever 2 further includes a projection *2d* in an extension of its rear end.

A lock plate 4 is held to be slidable in directions (as denoted by the arrows A and B) normal to the sliding movement of the respective levers 2 and 3 by inserting a guide hole *4a* about a guide shaft *1h* seated on the main chassis 1. Moreover, the lock plate 4 is constantly biased in the direction of the arrow A due to a spring 17 extending between a pin *4b* and a pin *1m* seated on the main chassis 1.

The lock plate 4 is further provided at its side edge facing against the play lever 2 with a lock portion *4c* which engages with the lock pin *2c* of the play lever 2 and holds the play lever 2 in the actuated position, and at another side edge facing against the stop lever 3 with an inclined portion *4d* which engages with the unlock pin *3c* of the stop lever 3.

A trigger arm 5 is made of a "L" shaped member pivoted about a support shaft *1c* of the main chassis 1, which has a horizontal segment or a pressure member *5c* held in contact with the rear end of the play lever 2 and a vertical segment carrying a projection *5b* at its rear end. A spring 18 extending between the pin *5a* and the pin *1n* on the main chassis 1 biases the trigger arm 5 in the direction of the arrow F while the span of the rotating movement of the trigger arm 5 is limited by a pin 18 seated on the main chassis 1. When the pressure portion *5c* is depressed upon actuation of the play lever 2, the trigger arm 5 rotates by a predetermined amount in the direction of the arrow E against the force of the spring 18.

A stop arm 6 is of an "L" configuration and a spring 19 extending between a pin *6a* at the tip portion of a horizontal segment of the stop arm 6 and a pin 10 on the main chassis 1 urges the stop arm 6 in the direction of the arrow F. The stop arm 6 also bears a projection *6b* at the bottom of the tip portion of its vertical segment.

While the stop arm 6 is constantly held in contact with the pin *1t* under the influence of the spring 19, it will rotate in the direction of the arrow E by a predetermined amount against the force of the spring 19 upon actuation of the stop lever 3.

A subchassis-actuating arm 7 is made of an "L" shaped member pivoted about the support shaft *1b* on the main chassis 1. The subchassis-actuating arm 7 includes a sliding hump *7a* at the bottom of the central portion of its horizontal segment traversing the top surfaces of the vertical segments of the trigger arm 5 and the stop arm 6 and a bearing surface 7c. A spring 20 extending between the pin 7b and a pin 1p seated on the main chassis 1 constantly forces the subchassis-actuating arm 7 to rotate in the direction of the arrow F. The spin of such rotating movement of the subchassis-actuating arm 7 is limited by a pin 1v.

The subchassis-actuating arm 7 pivotably carries, at a shaft 7d on the top surface of its horizontal segment, one end of a link arm 12 more closely to the pin 7b than the sliding hump 7a. The projection 2d of the play lever 2 is snugly fitted into an elongated slot 12a at the other end of the link arm 12. When the subchassis-actuating arm 7 rotates in the direction of the arrow E against the force of the spring 20 with rotation of a cam gear 8 to be discussed below, the play lever 2 slides toward the actuated position.

The cam gear 8 is pivoted about the support shaft 1a on the main chassis 1, which gear has at its periphery a tooth-free portion 8a and at its top surface a cam 8b of an annular strip with a radius of curvature varying gradually about a third hump 8f removably engaged with the projection 6b of the stop arm 6 and about the support shaft 1a.

The cam 8b in its inner surface 8c consists of a maximum diameter portion $8c_3$ in the furthermost position with regard to the tooth-free portion 8a, a minimum diameter portion $8c_1$ somewhat forward of the maximum diameter portion $8c_3$ in the direction of the rotating movement of the cam gear 8 and an inclined portion $8c_2$ intermediate the minimum and maximum diameter portions. The sliding hump 7a of the subchassis-actuating arm 7 slides on the cam inner surface 8c of the cam 8b so defined. Especially in the play mode, (including record mode) the sliding hump 7a slides on the minimum diameter portion $8c_1$, rotating the subchassis-actuating arm 7 in the direction of the arrow E against the spring 20 and bringing a subchassis to be discussed below back to the play position. Otherwise (including stop mode), the maximum diameter portion $8c_3$ is aligned with the sliding hump 7a to place the subchassis-actuating arm 7 into contact with the pin 1v under the influence of the spring 20.

Defined on the periphery of the cam 8 are first and second projections 8d and 8e which extend upwardly and radially from positions front and behind the maximum diameter portion $8c_3$ with regard to the direction of the rotating movement of the cam 8. The first projection 8d is removably engaged with the projection 5b of the trigger arm 5 and, when in such engaging relationship, is also engaged with one end of a starter spring 22 wound around a support shaft 1r on the main chassis 1, so that the starter spring 22 is compressed and maintained in an energy storage state with the aid of a pin 1u on the main chassis 1.

At the moment where the first projection 8d is disengaged from the trigger arm 5, the starter spring 22 in the energy storage state gives a kick at the first projection 8d due to its restoring force, enabling the cam gear 8 to rotate in the direction of the arrow. Moreover, the second projection 8e is removably engaged with the projection 6b of the stop arm 6.

A driving gear 9 is pivoted about a support shaft 1e on the main chassis 1 by means of a pulley 9a which is driven by a driving motor 10 via a conveyor belt 23 bridging the distance between the pulley 9a and a pulley 10b attached to a motor shaft 10a, thus driving the cam gear 8 under the engaging relationship where it is in meshing with teeth in the cam gear 8.

It is noted that in the stop mode the cam gear 8 is positioned against the tooth-free portion 8a due to the engagement between the projection 5b of the trigger arm 5 and the first projection 8d.

The subchassis 11 is movable forward and backward on the main chassis 1 by inserting upstanding guide shafts 1i and 1j on the main chassis 1 into guide holes 11a and 11b formed therein, which chassis carries an erase head 13 and a record/play head 14 mounted thereon. When the subchassis is moved in the directions of the arrows C and D, a magnetic tape in a cassette not shown comes into or out of contact with the respective heads. The subchassis is constantly biased toward the stop position by the action of the spring 21 in stop mode and then, upon rotation of the subchassis-actuating arm 7 in the direction of the arrow E, moves upward from the stop position toward the play position in the direction of the arrow C against the spring 21 by the action of the arm 7.

The mode selector assembly as discussed above will operate in the following manner.

(1) STOP MODE

Stop mode will be described by reference to FIG. 1. In stop mode both the play and stop levers 2 and 3 are forced into the forward or non-actuated position under the influence of the springs 15 and 16. The subchassis 11, on the other hand, stands in a stop position where the erase and record/play heads are out of contact with the magnetic tape in the cassette under the influence of the spring 21.

The cam gear 8 is in engaging relationship with the projection 5b of the trigger arm 5 with its first projection 8d in contact with the pin 1a (this is referred to as "first position") so that the rear end of the tooth-free portion 8a (the end of the cam gear 8 in the direction of its rotation) is positioned opposite the driving gear 9 and the maximum diameter portion $8c_3$ of the cam inner surface 8c is in contact with the sliding hump 7a of the subchassis-actuating arm 7.

Because the maximum diameter portion $8c_3$ in the cam inner surface 8c is faced against the sliding hump 7a, the subchassis-actuating arm 7 is drawn into contact with the pin 1v under the influence of the spring 20 with its bearing surface 7c spaced away from the subchassis 11 (this is referred to as the "first position" of the subchassis-actuating arm 7). The stop lever 6 is in contact with the pin 1t (this is referred to as "first position" of the stop arm) and ready to engage with the third projection 8f of the cam gear 8.

(2) CHANGE FROM STOP MODE TO PLAY MODE

Figure 2:
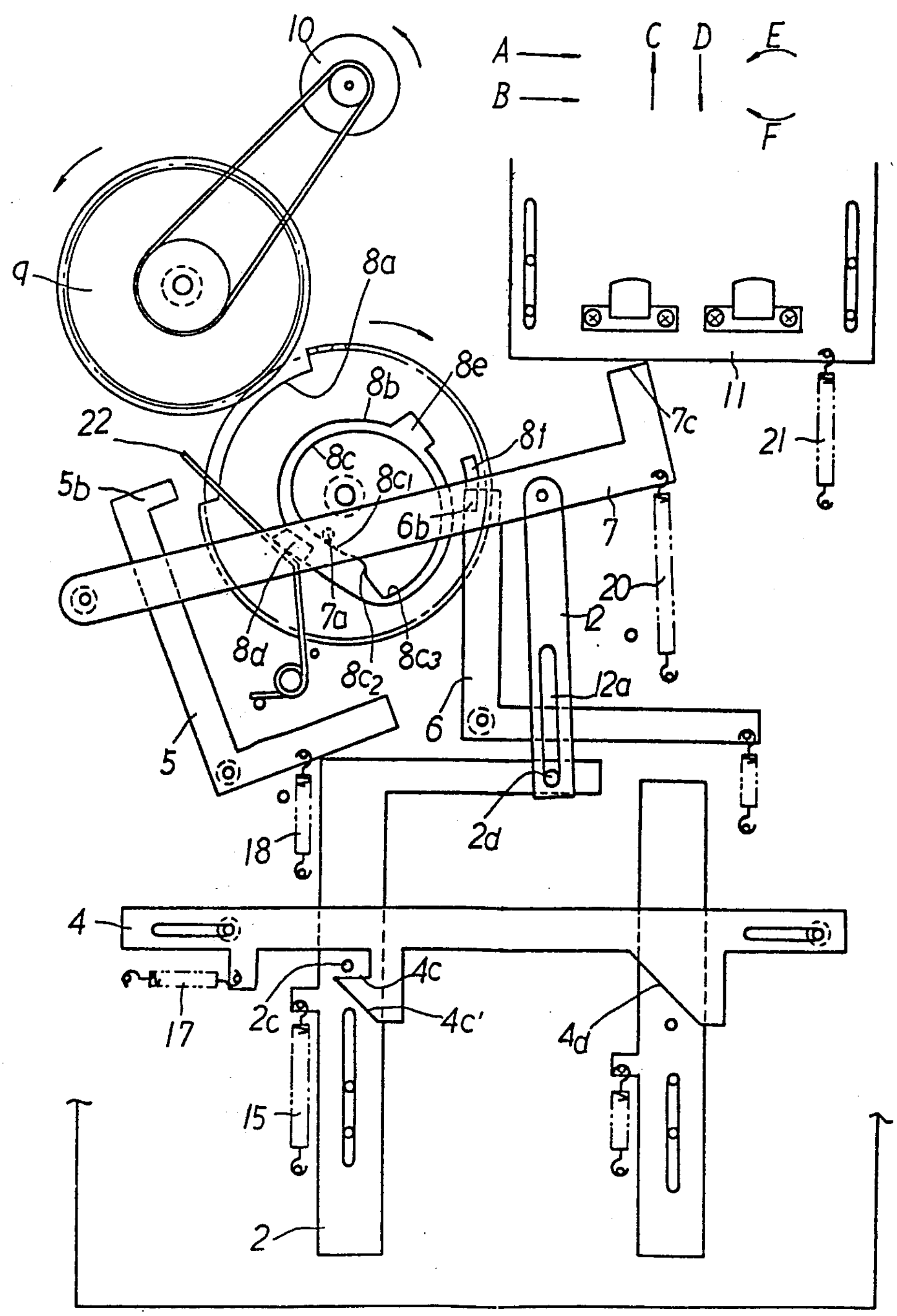
FIG. 2 shows the play mode.

Change of mode takes place from stop mode to play mode as best shown in FIGS. 1 and 2. When the play lever 2 is actuated in the direction of the arrow C against the spring 15 in the stop mode, the trigger arm 5 turns in the direction of the arrow E against the spring 18. The projection 5b on the trigger arm 5 is disengaged from the first projection 8d on the cam gear 8 at a point in time where the lock pin 2c is about to contact the inclined surface 4c' of the lock portion 4c of the lock plate 4. As a result, the cam gear 8 immediately rotates in the direction of the arrow F under the influence of the starter spring 22, previously held in an energy storage state, and comes into engagement with the driving gear 9. This results in further rotation of the cam gear 8.

Afterward, the play lever 2 is locked with the lock portion 4*c* of the lock plate 4 by means of the lock pin 2*c* and held in an actuated position. Since the diameter of the cam inner surface 8*c* in contact with the sliding hump 7*a* with the rotating movement of the cam gear 8 gradually decreases, the subchassis-actuating arm 7 rotates in the direction of the arrow E against the spring 20 and enables the subchassis 11 to move slowly backward of the stop position via the bearing surface 7*c*.

As soon as the cam gear 8 makes substantially a complete revolution and the forward end of the tooth-free portion 8*a* is aligned with the driving gear 9 or immediately before the first projection 8*f* reaches the projection 6*b* on the stop arm 6, the cam gear 8 is no longer driven by the driving gear 9. Furthermore, since the sliding hump 7*a* comes into contact with the minimum diameter portion $8c_1$ of the cam inner surface 8*c* and then into the inclined surface $8c_2$, the cam gear 8 is given the rotating torque, as denoted by the arrow F by the spring 20 via the sliding hump 7*a*, to rotate to some extent. The cam gear 8, however, discontinues rotating as soon as the third projection 8*f* engages the projection 6*b* on the stop arm 6.

At the same time the subchassis-actuating arm 7 shifts the subchassis 11 to the backward or play position and holds the same in this position where the erase and record/play heads 13 and 14 are in contact with the tape (this is referred to as "second position" of the subchassis-actuating arm 7). Under this circumstance the tape is driven to travel at a normal speed by a normal speed driving mechanism (including two reels) which becomes operative when the play lever 2 is locked in the actuated position). The trigger arm 5 is still rotating in the direction of the arrow E in association with the play lever 2 in the actuated position, with its projection 5*b* being out of a path for the rotating movement of the cam gear 8 (this is referred to as "second position" of the trigger arm). The above procedure places the tape recorder completely into the play mode.

The following aspects of the present invention should be emphasized in connection with transition from stop mode to play mode. Provided that the play lever 2 is actuated to disengage the projection 5*b* on the trigger arm from the first projection 8*d* on the cam gear 8 and thereupon the cam gear 8 rotates in the direction of the arrow E to cause the rotating movement of the subchassis-actuating arm 7 in the direction of the arrow E, the subchassis-actuating arm 7 during rotation draws the play lever 2 in the direction of the arrow C against the spring 15 via the link arm 12 so that the play lever 2 is locked with the lock portion 4*c* of the lock plate 4 by way of the lock pin 2*c* when the subchassis-actuating lever 7 reaches the second position.

In other words, as long as the play lever 2 is actuated, the projection 5*b* of the trigger arm is disengaged from the first projection 8*d* of the cam gear to rotate the cam gear until the lock pin 2*c* of the lever 2 is locked with the lock portion 4*c* of the lock plate 4. Since the play lever 2 is forcedly brought toward the actuated position in response to the rotating movement of the cam gear, the play lever 2 is shifted to the actuated position automatically, even if the play lever 2 is released from depression or actuation force before the lock pin 2*c* of the play lever is locked with the lock portion 4*c* of the lock plate 4. Accordingly, the tape recorder is placed as a whole into play mode as well as the play lever 2.

(3) CHANGE FROM PLAY MODE TO STOP MODE

In the play mode as shown in FIG. 2, the stop lever 3 is depressed in the direction of the arrow C against the spring 16 so that the unlock pin 3*c* of the lever 3 comes into contact with the inclined surface 4*d* of the lock plate 4 and the lock plate 4 moves in the direction of the arrow B against the spring 17. Thus, the play lever 2 is unlocked from the lock portion 4*c* and comes into contact with stop arm 6 in the first position due to engagement between the third projection 8*f* of the cam gear 8 and the projection 6*b*. This results in rotating the arm 6 in the direction of the arrow E against the spring 19 and moving the arm out of its engaging position with the third projection 8*f*. The stop arm moves to the position where it is at an engageable distance with respect to the second projection 8*e* of the cam gear 8 (this is referred to as "second position" of the stop arm).

As soon as the stop arm 6 is disengaged from the third projection 8*f*, the cam gear 8, which is in contact with the sliding hump 7*a* of the subchassis-actuating arm 7 at the inclined surface $8c_2$ of the cam inner surface 8*c*, is prevented from rotating under the influence of the spring 20 but will restart rotating in the direction of the arrow F.

Since the sliding hump 7*a* is aligned with the maximum diameter portion $8c_3$ of the cam inner surface 8*c* with rotation of the cam gear 8, the subchassis-actuating arm 7 returns to the first position by the force of the spring 20 and at the same time the subchassis 11 returns to the stop position under the spring 21. The spring 15 forces the play lever 2, unlocked from the lock plate 4, back to the non-actuated position.

At the point in time where the subchassis 11 returns to the stop position and the play lever 2 returns to the non-actuated position, the projection of the stop arm 6 engages with the second projection 8*e* of the cam gear to stop rotation of the cam gear 8 temporarily and the trigger arm returns to the first position. Under this circumstance the projection 5*b* of the trigger arm 5 is ready to engage with the first projection 8*d*. It is noted that the starter spring 22 is in an energy storage state.

Figure 3:
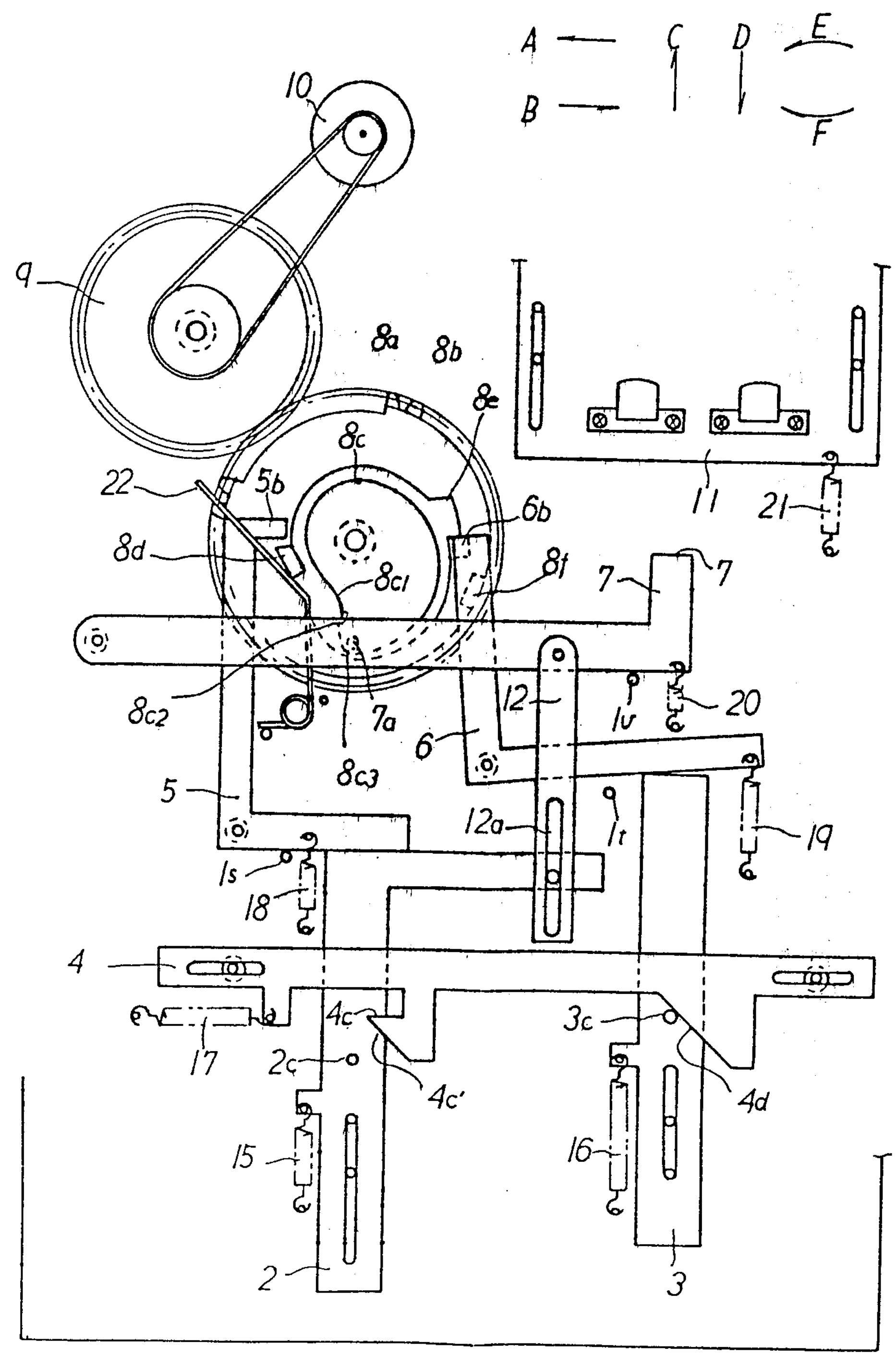
FIG. 3 shows the transition state immediately before the tape recorder changes from the play mode to the stop mode.

The above events occur when the stop lever 3 is actuated (see FIG. 3). Then, if the stop lever 3 is released from the actuating force, the lever 3 returns to the non-actuated position under the spring 16 and the stop arm 6 returns to the first position under the spring 19.

Because the projection 6*b* is out of engagement with the second projection 8*e* due to the returning movement of the stop arm 6 and the cam gear 8 is given a rotational torque in the direction of the arrow F by the starter spring 22 in energy storage state, the cam gear 8 starts rotating in the direction of the arrow F in response to the starter spring 22 and then stops rotating when the first projection 8*d* comes into contact with the projection 5*b* of the trigger arm 5, already in the first position. Through the above procedure the respective components are now in the stop mode as shown in FIG. 1 and the normal speed driving mechanism is rendered nonoperative because of the play lever in the non-actuated position.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A mode selector assembly for use in a tape recorder for placing the tape recorder into a selected operating mode by means of a rotating member, upon the actuation of an actuator lever, said mode selector assembly comprising a rotating member having a cam surface, interlocking means provided between the actuator lever and the rotating member for achieving a sliding movement with the rotational movement of the cam surface, responsive to rotation of the rotating member and connecting means for connecting the actuator lever to the interlocking means, wherein upon the actuation of the actuator lever, the rotating member is rotated, and the actuator lever is shifted to its actuated position via the interlocking means, in response to the rotation of the cam surface.

2. A mode selector assembly for use in a tape recorder for selectively placing the tape recorder into a stop or play mode which comprises, in combination a driving gear, a rotating member containing a cam gear and adapted to be brought into operational engagement with said driving gear a trigger arm adapted to be brought into and out of engagement with a portion of said cam gear, a stop arm adapted to be brought into and out of engagement with another portion of said cam gear and a play lever and a stop lever operatively communicating with said trigger arm and stop arm respectively, whereby, when operating in said stop mode, both of said play and stop levers are forced into a non-actuated position, the cam gear is in engaging relationship with the trigger arm, the driving gear is free of engagement with the rotating member and the erase and record/play heads are out of contact with the tape and, when operating in said play mode, the actuation of the play lever disengages the trigger arm from the cam gear, causing the rotating member and the associated cam gear to rotate into engagement with the driving gear which causes further rotation of the cam gear and the subsequent locking of the play lever in an actuated position with the erase and record/play heads being placed into contact with the tape.

3. The mode selector assembly of claim 2 wherein a start spring is operatively associated with said rotating member for imparting rotation to the rotating member upon the actuation of said play lever.

* * * * *